United States Patent [19]

Coleman

[11] Patent Number: 4,756,700
[45] Date of Patent: Jul. 12, 1988

[54] WATER RECREATIONAL DEVICE

[76] Inventor: John P. Coleman, 524 Anchor Cir., Redwood City, Calif. 94065

[21] Appl. No.: 48,080

[22] Filed: Apr. 11, 1987

Related U.S. Application Data

[63] Continuation-in-part of Ser. No. 789,395, Oct. 21, 1985, abandoned.

[51] Int. Cl.$^4$ .............................................. B63B 21/56
[52] U.S. Cl. .................... 441/65; 114/242; 114/253
[58] Field of Search ............. 441/72, 73, 65; 114/242, 253; 403/108, 330; 74/551.1, 551.2, 551.3, 551.7

[56] References Cited

U.S. PATENT DOCUMENTS

| D. 194,489 | 1/1963 | Stevens | 441/72 |
|---|---|---|---|
| 596,814 | 1/1898 | King | 74/551.7 |
| 1,068,158 | 7/1913 | Noack | 74/551.7 |
| 2,543,381 | 2/1951 | Rosenzweig | 280/47.37 R |
| 2,894,760 | 7/1959 | Kolstad | 441/68 |
| 2,958,875 | 11/1960 | McClain | 441/65 |
| 3,027,574 | 4/1962 | Meehan | 441/79 |
| 3,125,060 | 3/1964 | Leonard | 114/253 |
| 3,204,263 | 9/1965 | Bash | 441/72 |
| 4,577,837 | 3/1986 | Berg et al. | 403/108 |

OTHER PUBLICATIONS

Sea-Sled by Angel-Bell, Inc.
The 1985 Catalog of O'Brien International, A Coleman Company, 1985.
The 1985 Catalog of Connelly Skis, Inc., 1985.
Advertisement of Water Sport Industries.

*Primary Examiner*—Sherman D. Basinger
*Assistant Examiner*—Edwin L. Swinehart
*Attorney, Agent, or Firm*—Mallinckrodt & Mallinckrodt

[57] ABSTRACT

A water recreational device wherein provision is made for a board member which supports a person on a body of water so that the person may be towed by a tow line over a water surface. The device includes an elongate balancing and steering control member by which a person using the device can maintain control. The device may include a support board member or an adapter for fastening to the usual ski or surfboard-style support presently on the market. In either instance, the device comprising a latching holding arrangement between the control member and the user support provision, whereby the user of the device can latch the control member at at least one predetermined height relative to a support board.

25 Claims, 6 Drawing Sheets

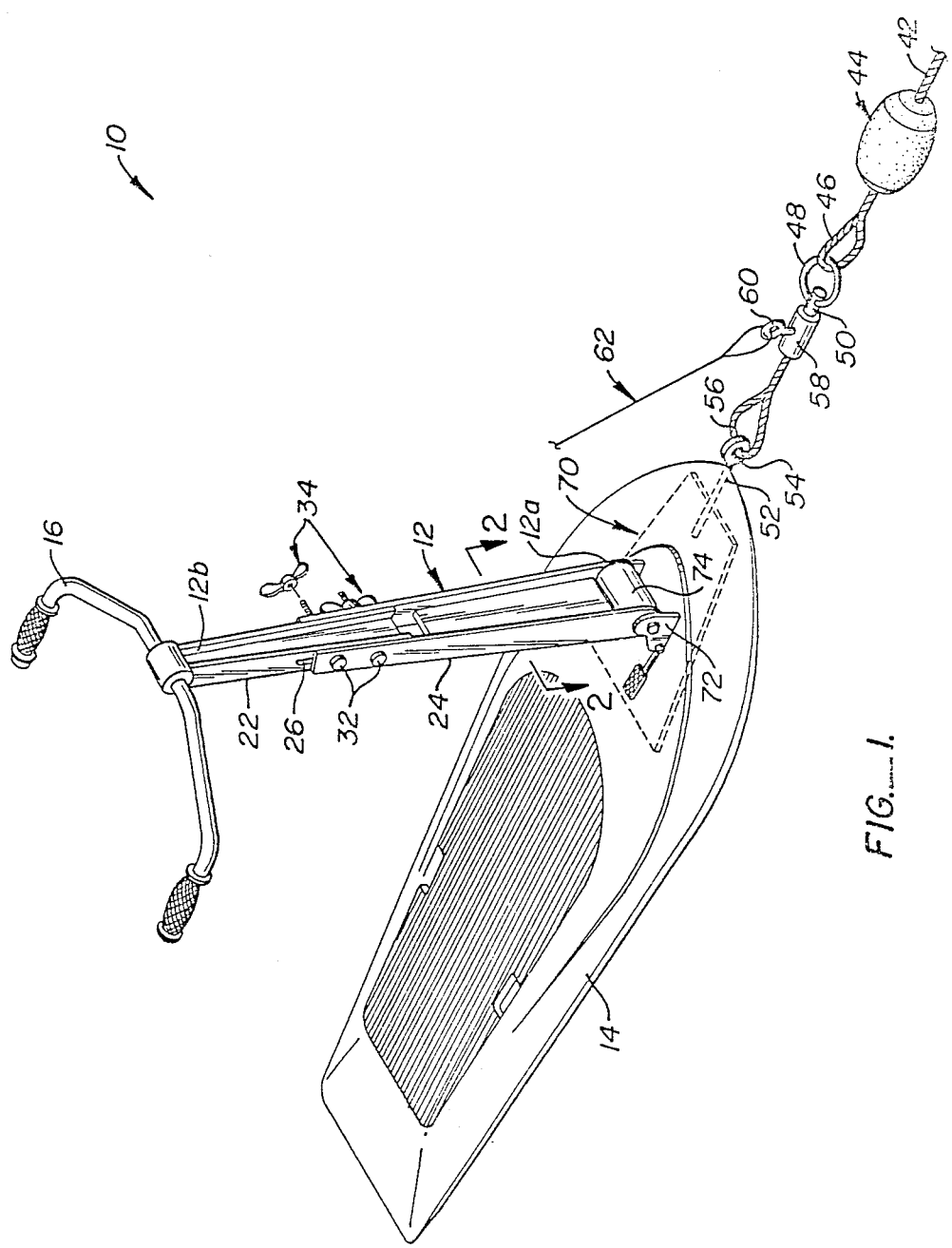

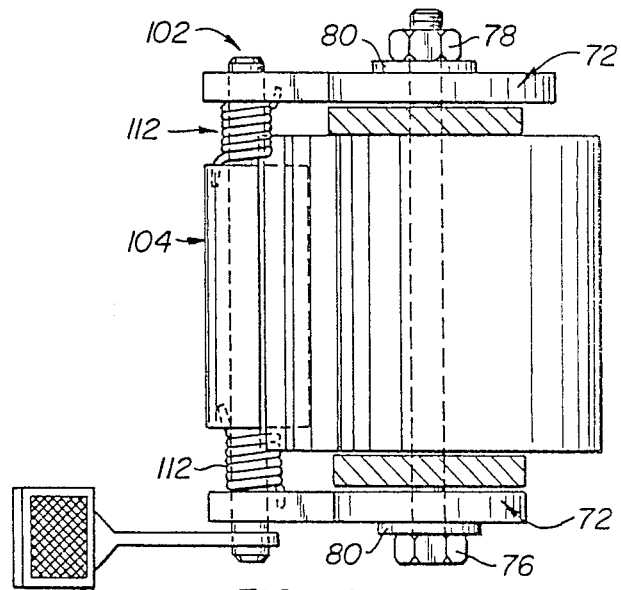
FIG._2.
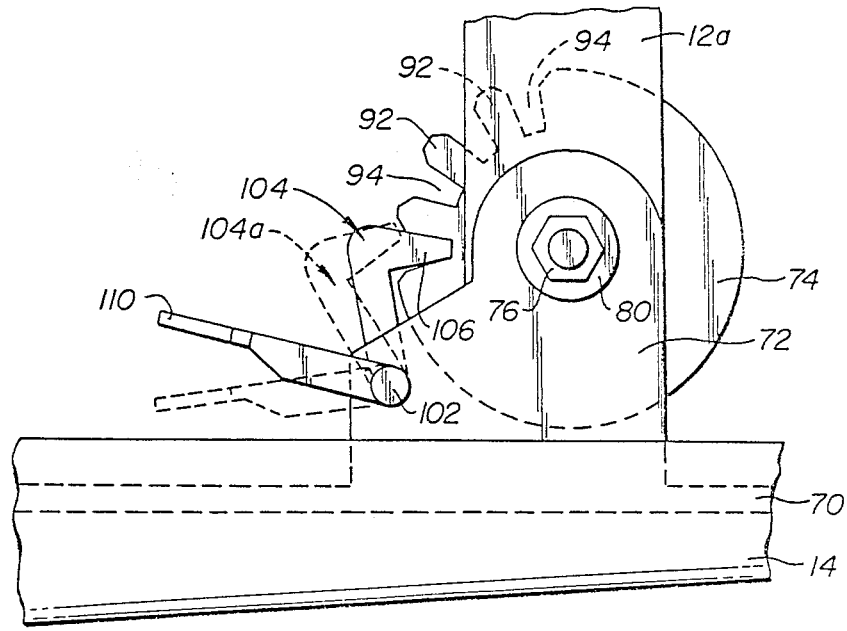
FIG._3.

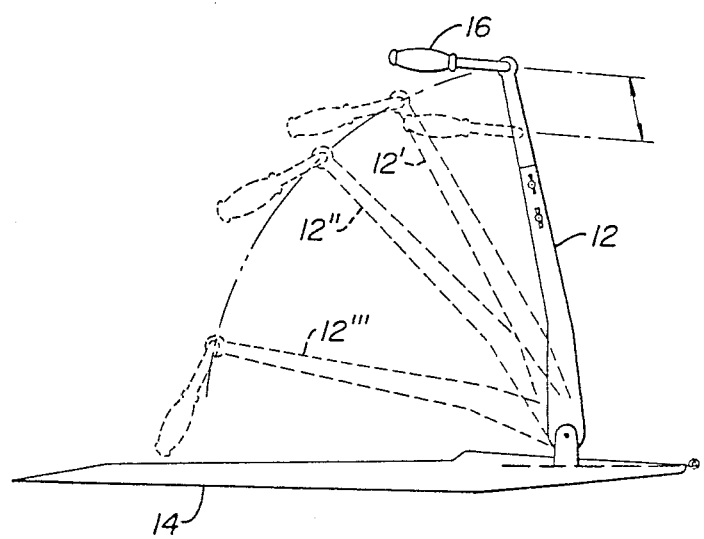
FIG._4.

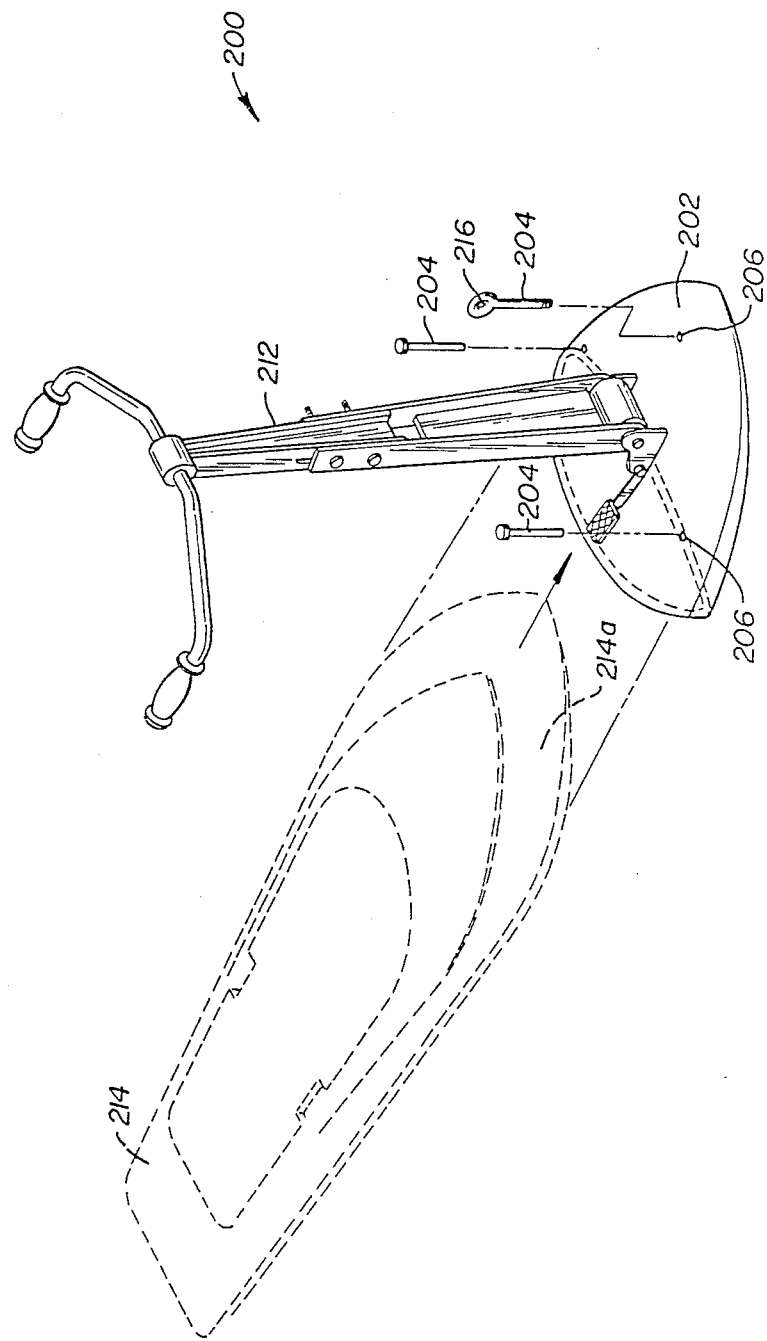

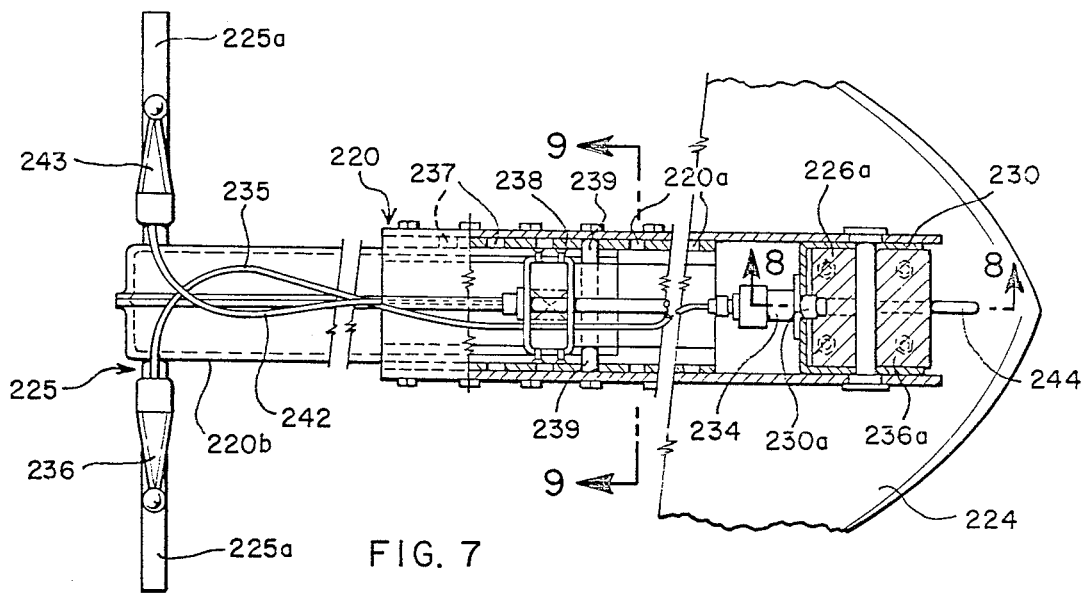
FIG. 7
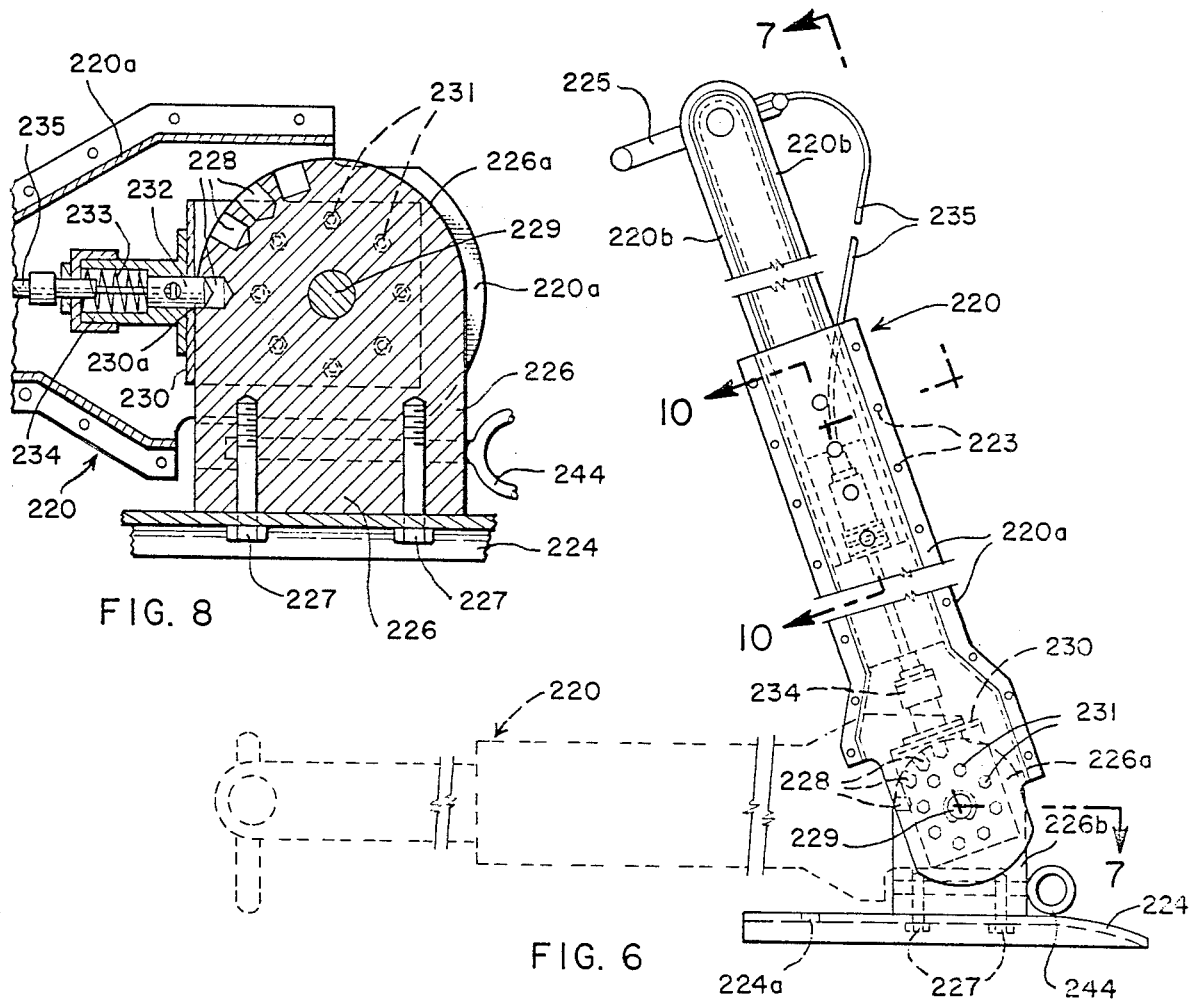
FIG. 8
FIG. 6

4,756,700

WATER RECREATIONAL DEVICE

RELATED APPLICATION

The present application is a continuation-in-part of application Ser. No. 789,395, filed Oct. 21, 1985 now abandoned.

BACKGROUND OF THE INVENTION

1. Field:

This invention relates in general to water recreational devices and in particular to such devices for use by persons desiring to be towed on water surfaces.

2. State of the Art:

Water skiing is a popular sport. In water skiing the water skier is supported by one or more water skis on the water surface and the skier holds on to a tow line from a tow boat for towing the skier. The skier maneuvers and steers by shifting his or her body weight. Water skiing, however, is a sport requiring skills and good physical and muscle conditions which limit the enjoyment of the sport to a small part of the public.

A surfboard-style of water recreational device has been developed heretofore which requires less skill than water skiing. It is wider than a water ski and provides a smoother ride. Its design is such that it throws water away from the board and the rider, and it is more enjoyable than water skis for some riders, especially older people. The rider of such a board may bend his or her knees and will frequently be kneeling on the device while being towed as in water skiing. For this reason, such a surfboard-style of device is sometimes referred to as "knee board". As in water skiing, the riders of such devices maneuver and steer by weight shifting.

None of these types of water recreational devices is entirely satisfactory. While it is desirable to eliminate or reduce stress on arms and legs to allow participation by a wider section of the public, it is simultaneously desirable to allow the rider to retain balancing and steering control. It is therefore desirable to provide a water recreational device that can accomplish both purposes, even with a water ski although a surfboard-style support is much preferred.

SUMMARY OF THE INVENTION

This invention is directed toward providing a water recreational device capable of supplying a support board member for supporting a person while being towed over the surface of a body of water. The device includes elongate balancing and steering control means for the person on the support member and rider-operated means for changing the effective height of such control means relative to the support board member from time to time while riding. The balancing and steering control means may be secured to the support member as original equipment or may be provided with an adapter for attachment to a usual water ski, kneeboard, or other support board previously acquired.

THE DRAWINGS

The accompanying drawings illustrate the best mode presently contemplated of carrying out the invention.

In the drawings:

FIG. 1 is a perspective view of a surfboard-style water recreational device embodying the invention and showing a portion of a tow line arrangement;

FIG. 2, a horizontal sectional taken on the line 2—2 of FIG. 1 drawn to a larger scale and excluding the support board;

FIG. 3, a side elevation of the structure of FIG. 2, showing the support board member fragmentarily;

FIG. 4, a schematic view of the device of FIG. 1 illustrating by broken lines different positions of the elongate balancing and steering control member relative to the support board member;

FIG. 5, a perspective view of another form of the invention including an adapter for attachment to an existing support board (shown in phantom);

FIG. 6, a vertical section taken front to back through another embodiment of the invention having an adapter for attachment to a support and showing in full lines the elongate balancing and steering control member in a raised position and in the lowermost position by dotted lines;

FIG. 7, a horizontal section partly in top plan taken on the line 7—7 of FIG. 6;

FIG. 8, a fragmentary longitudinal section taken on the line 8—8 of FIG. 7;

FIG. 9, a transverse section taken on the line 9—9 of FIG. 7 and drawn to a considerably larger scale; and FIG. 10, a fragmentary view in longitudinal axial section through an intermediate portion of the control member taken from side-to-side thereof on the line 10—10 of FIG. 6 rather than from front to back as in FIG. 6 and drawn to the larger scale of FIG. 9.

DETAILED DESCRIPTION OF THE ILLUSTRATED EMBODIMENTS

Figure 9:
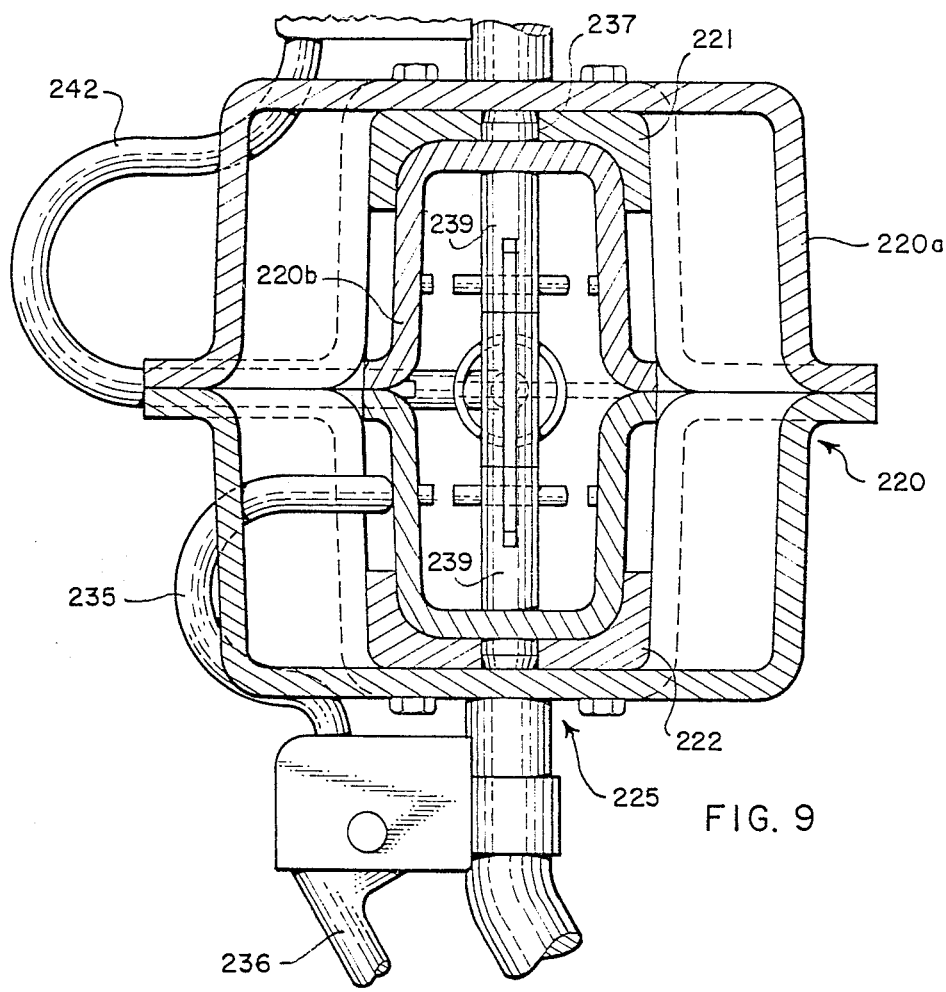

This invention is based on the recognition that balancing and steering control for a rider-support-board type of water recreational device can be improved by providing an elongate balancing and steering control member connected to means providing for the support of a person while being towed over the surface of a body of water. The rider need no longer rely only on weight shifting for maneuvering and steering, thereby improving control and reducing stress on the body. The balancing and steering control member is arranged so as to be positionable by the person using the device at a convenient elevation above the support board and the water surface. Also, preferably, such member includes grip means for gripping by the rider.

In FIG. 1, a water recreational device 10 includes means for providing balancing and steering control in the form of an elongate member 12 connected to means providing support for a person while being towed. As here shown, such means is a rider support board member 14. While device 10 illustrates the invention as applied to a surfboard-type device, it will be understood that the invention is also applicable to a water ski, knee board, or other similar device having a board member for supporting a rider on water while being towed. The elongate member 12 has a lower end 12a and an upper end 12b. End 12a is connected to board 14 and end 12b may be moved to a position at an elevation from the support board member and the water surface convenient for the rider, such as at chest or shoulder level. For the convenience of the rider, a bicycle type of handle bar 16 is preferably connected to the upper end 12b of member 12.

As here shown, member 12 is made up of two sections 22 and 24 slidably connected to each other for initially adjusting the length of such control member 12 so that the elevation of its upper end 12b accommodates the height of a particular rider. Section 22 has elongated slots for height adjustment purposes 26 therein. Sections 22 and 24 are connected by bolts 32 and wing nuts 34. Bolts 32 pass through holes in section 24 and through slots 26 of section 22 so that section 22 may be raised or lowered relative to section 24. After section 22 is adjusted so that its upper end 12b is at the desired elevation, wing nuts 34 are tightened to securely fix section 22 at such position.

Board 14 is towed by a tow line 42, which is threaded through a float 44 to keep its end 46 afloat for convenient connection to board 14. End 46 is in the shape of a loop threaded through a ring 48, which in turn passes through a latch pin 50. A portion of a pin 52 is embedded in board 14. The protruding portion of pin 52 has an eye 54 through which a rope 56 passes and is then fastened upon itself to form a loop. The other end of rope 56 is secured to a lock and release mechanism 58 for latch pin 50. A suitable mechanism 58 is the Panic Snap Release from Proline Incorporated of Milwaukee, Wisconsin. When latch 50 is snap fitted into mechanism 58, latch pin 50 is locked into secure connection with board 14 through pin 52, rope 56 and mechanism 58. To release pin latch 50 from mechanism 58, release pin 60 is pulled by pulling release line 62, thereby releasing the tow line 42 from board 14. Release line 62 may be simply wrapped around the wrist of the rider of board 14 so that board 14 may be released from tow line 42 at any desired time.

The manner in which the lower end 12a of elongate balancing and steering control member 12 may be connected to support board member 14 to provide rider-operated adjustment of the angular relationship between such control member and support board member will now be described in reference to FIGS. 2 and 3. FIG. 2 provides a top plan view of end 12a and associated parts for connection to board 14, which has been omitted in FIG. 2 to simplify the drawing. FIG. 3 is a side view of a portion of member 12 and board 14 and of the reciprocal latching parts connecting the two. As shown in FIGS. 1 and 3, plate 70 is embedded in board 14 and has two brackets 72 protruding from the top surface of board 14. End 12a of member 12 has a drum 74 as an integral part thereof, i.e. fixedly secured thereto, so as to rotate therewith about a common axis. In reference to FIGS. 2 and 3, both drum 74 and end 12a of member 12 are rotatably connected to brackets 72 by bolt 76, nut 78, and washers 80. At least a portion of drum 74 is of cogwheel formation, with cogs 92 defining detent-receiving notches 94 between adjacent cogs to enable fixed angular positioning of control member relative to support board member at an angle of from zero degrees toward ninety degrees, as shown.

Shaft 102 is rotatably connected to the two brackets 72 as shown in FIGS. 2 and 3. Shaft 102 has fixedly mounted thereon a detent dog 104. Dog 104 has latch portion 106 which is shaped to fig snugly into each one of the notches 94. Thus, when dog 104 is rotated about shaft 102 towards drum 74 so that latch 106 fits into one of the notches 94 as shown in FIGS. 2 and 3, the drum and member 12 are fixed in position relative to board 14. When shaft 102 and dog 104 are rotated away from notch 94, so that the dog is in the position shown in phantom, see 104a, drum 74 and member 12 will be free to rotate about bolt 76. Therefore, the rider can control the position of member 12 by rotating shaft 102.

When it is desired to lock control member 12 in a particular position of height adjustment, dog 104 is rotated toward drum 74 until latch 106 fits into one of the notches 94 to lock member 12 in such position. When it is desired to change the position of member 12, dog 104 is rotated away from drum 74 so that latch 106 is withdrawn from notch 94 allowing drum 74 to rotate about bolt 76. A foot pedal 110 connected to shaft 102 is used to enable the rider to accomplish such control. Shaft 102 is threaded through two springs 112 which spring-load the connection between dog 104 and drum 74. Thus, if foot pedal 110 is not pressed, springs 112 urge dog 104 towards drum 74, thereby causing latch 106 to enter and remain in one of the notches 94. If a different position of member 12 is desired, the rider simply presses foot pedal 110, thereby rotating shaft 102 against the urging of springs 112 to withdrawn latch 106 from notch 94 into position 104a. The rider can then rotate member 12 until it is in a desired position. Foot pedal 110 is then released so that springs 112 urge dog 104 toward drum 74 causing latch 106 to slide into one of the notches, thereby fixing member 12 at the desired angle relative to rider support board 14.

The positions of notches 94 on drum 74 define the number of possible elevations for member 12. Such positions of member 12 are illustrated in FIGS. 4 as positions 12, 12', 12" and 12'". As shown in FIG. 3, drum 74 has three cogs but four notches. When the latch 106 is lodged in the uppermost notch in FIG. 3, member 12 is substantially in the vertical position indicated 12 in FIG. 4, where board 14 is on a water surface. When the latch 106 is lodged in the lowest notch, as in the position of FIG. 3, member 12 will be in the zero angular position 12'" adjacent to board 14 for easy transport. When latch 106 is lodged in one of the two intermediate positions, member 12 will be in position 12' or 12". Obviously, a different number and orientation of notches 94 and positions of member 12 than those of FIGS. 3 and 4 may be provided and are within the scope of this invention.

It can be seen that drum 74 and dog 104 constitute a reciprocal latching arrangement of detent nature between balancing and steering control member 12 and support board member 14 providing a series of latching positions concentric with the axis of rotation of member 12.

For convenience of manufacture, pin 52 may simply be an extension of plate 70 and plate 70 is simply placed in a mold for molding board 14 so that after the molding process, plate 70 is embedded therein. Plate 70 may be made from a sturdy but light metal such as aluminum. Member 12 and board 14 may both be made from a plastic material such as polyurethane.

Instead of including a support board member as part of the device, the invention contemplates that the device may include an adapter as the board means as the means for providing support for a rider. It does this by fitting over the front end of a board member, such as a water ski, kneeboard, or other surfboard-like support presently on the market. Such a device is shown in perspective in FIG. 5. As indicated at 200, the device comprises an adapter 202 in the form of a housing into which the nose 214a of a water ski, kneeboard, or other surfboard-style support 214 fits. Pins 204 may then be inserted into corresponding holes 206 in the adapter after the support board 214 is inserted thereinto. Matching holes in support board 214 may be drilled corresponding to holes 206 in the housing. Then pins 204 are inserted into holes 206 and the matching holes in suport board 214 to securely connect support board 214 to housing 202. Member 212 is similar to member 12 of FIGS. 1–4. Again, a plate (not shown in FIG. 5) similar to plate 70 of FIGS. 1 and 3 may be embedded into housing 202 with protruding brackets for connecting housing 202 to member 212. The cogwheel, spring-loaded latch, and release foot pedal may be used with adapter 202 as described above in reference to FIGS. 1–4 to control the desired position of member 212. Pin 204 at the front of housing 202 may have a head defining an eye 216 to which a lock and release mechanism similar to mechanism 58 of FIG. 1 may be attached.

While in FIG. 5, housing 202 is shown as having a shape generally similar to that of the front portion 214a of support board member 214, it will be understood that housings or hoods of other shapes and sizes may also be used so long as they are shaped to fit over and about the forward end of a user support board member. All such arrangements are within the scope of the invention. Again housing 202 may be made conveniently from a plastic material such as polyurethane.

A more advanced embodiment of the invention, now preferred, is illustrated in adapter mode in FIGS. 6–10. As there shown, an elongate balancing and steering control member 220 comprises lower and upper telescoped tubular sections 220a and 220b, respectively, the upper section preferably being slidable within and along the lower section in a trackway provided by oppositely positioned pairs of tracks 221 and 222, FIG. 9. Both sections are desirably made up from longitudinal half sections provided with externally extending flanges that are fastened together, as by series of screws 223, FIG. 6, when the half sections are brought face-to-face.

One end, i.e. the lower end, of elongate control member 220 is rotatably secured to means providing for the support of a rider. As here shown, such means is an adapter 224, in the form of a hood. The other end, i.e. the upper end, of control member 220 has fastened thereto handle means in the form of a handle bar 225 having a pair of oppositely disposed handles 225a, respectively, for grasping by the user of the device.

Adapter 22 is contoured to fit over the forward, tip end of a conventional water ski, knee board, or other surfboard type of support for a user of the water recreational device, and is provided with screw, rivet, or bolt holes 224a for use in securely fastening such adapter hood to the support board.

Interposed between the lower end of lower section 220a of elongate balancing and steering control member 220 and the upper surface of adapter 224 is another form of reciprocal latching means for holding such elongate control member at a certain selected angle relative to the board means, here adapter 224. As illustrated, such latching means comprises a semi-circular drum member 226a, see especially FIG. 8, provided as the upper part of a pivot block 226 that is securely fastened to and upstanding from the upper surface of adapter 224 as by means of cap screws 227. The drum member is provided with a partially circumferential series of detent-receiving, latching recesses 228, respectively, concentric with the rotative axis (here shown as provided by a pivot pin 229) of elongate control member 220.

The lower end of elongate control member 220 is rotatably mounted on pivot pin 229 by means of a U-shaped bracket 230, FIGS. 6 and 7, to which it is secured as by screws 231, and which is itself journaled on pivot pin 229. Such control member 220 may thus execute pivotal movement about drum member 226a.

The reciprocal latching means also comprise a detent latching element in the form of a latch pin 232, FIG. 8, constantly urged toward and against the surface of drum 226a by a spring 233 for entry into one of the latching recesses 228 as selected by the user of the device. Latch pin 232 is mounted for longitudinal reciprocation in a housing 234 secured to the outside of the central part of U bracket 230. As so mounted, it confronts and passes through a receiving opening 230a through such part of the bracket.

For enabling the user of the device to control the angle between member 220 and adapter 224, and this to at least partially control the height of the upper, handle end of elongate control member 220 above a support board to which adapter 224 is fitted, a flexible line 235 (usually a cable) has one end fastened to the rearward end of latch pin 232 and the other end fastened to an operating lever 236 pivoted to handle bar 225 conveniently adjacent to one of the handles 225a. When the user of the device squeezes lever 236 toward such handle 225a, cable 235 pulls latch pin 232 to overcome the force of spring 233 and retract it from whichever latching recess of drum 226 to might have been in. Release of such lever will permit the latch pin to enter a successive recess of the series under spring pressure, thereby enabling the user to readily select the final held position of the elongate control member while riding.

For similarly enabling the user to select a certain length of elongate control member 220 for favorable balancing and steering control, which also affects the height of the handle end of such control member above the support board, a second reciprocal latching arrangement is provided between the lower and upper longitudinal sections 220a and 220b of such control member. In the form shown, oppositely disposed series of detent-receiving latching elements 237 are provided in the form of latch-pin-receiving recesses spaced along opposite longitudinal side walls of lower control member section 220a, as by the providing of apertures in tracks 221 and 222 attached to the interior faces of such side walls. A pair of oppositely facing latch pins 239, respectively, mounted for reciprocation transversely of elongate control member 220 through respective accommodating openings in the longitudinal side walls of upper control member section 220b, provide detent latching elements for entering selected sets of opposed detent-receiving recesses 237.

Figure 10:
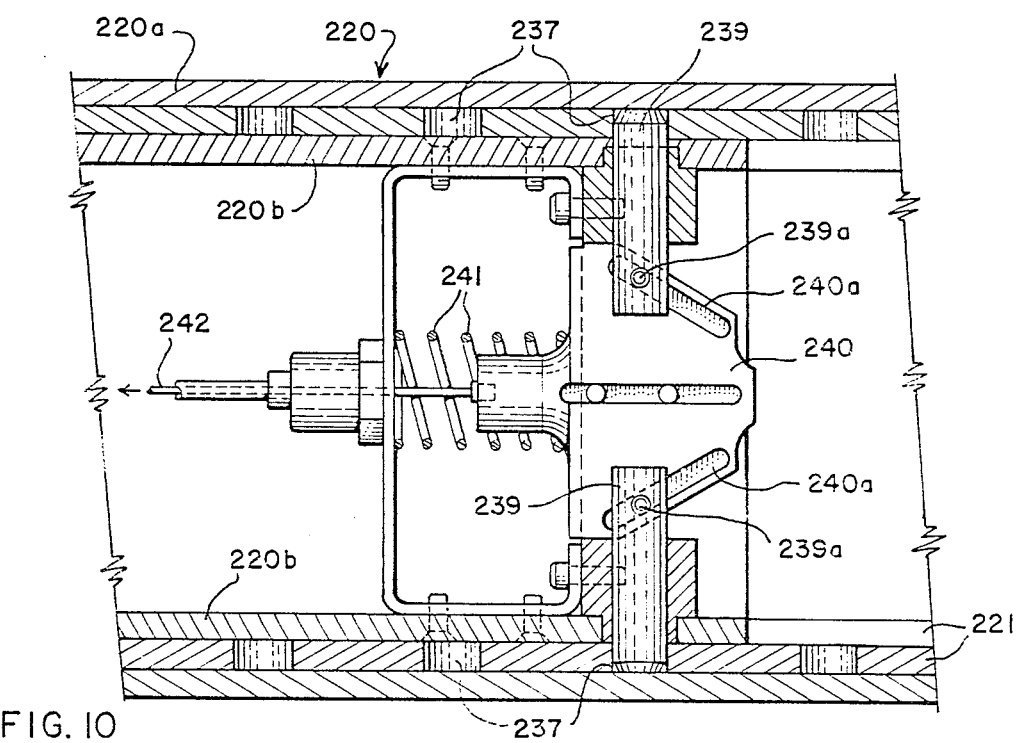

Latch pins 239 are actuated by respective cam plates 240, FIG. 10, into cam slots 240a of which extend camming projections 239a, respectively, of such latch pins for back and forth sliding movement. Extension of the latch pins toward and into a set of opposing recesses 237 is effected by a spring 241 bearing against the cam plates, while retraction of such latch pins is effected when the user pulls cable 242 that connects the cam plates with a lever 243 pivotally mounted conveniently adjacent to the other handle 225a of handle bar 225. Pressing of lever 243 toward such handle 225a by the rider while riding pulls cable 242 to retract cam plates 240 against the urge of spring 241 and to force latch pins 239 through their retraction strokes for unlatching the two sections 220a and 220b of the control member. As the rider slides upper section 220b in or out relative to lower section 220a, release of lever 243 will permit spring 241 to relatch the two sections in the desired adjusted position.

For attaching a tow line to the device, an eye bolt 244 is screwed into the lower part of pivot block 226, which block, as before indicated, is securely fastened to adapter 224.

Whereas this invention is here illustrated and described with specific reference to preferred embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A water recreational device, comprising means providing for the support of a person while being towed over the surface of a body of water; an elongate balancing and steering control member having a lower end rotatably secured to said means, for pivotal movement relative thereto, and an upper end carrying a handle for gripping by the person using the device and for pivotally raising or lowering said balancing and steering control member relative to said means about the axis of rotation of the securement of said lower end of the balancing and control member to said means; latching means interposed between said lower end of the balancing and control member and said mean providing for the support of a person and adjacent to and in operative association with said axis of rotation for normally securely holding said upper end of said balancing and control member at a selected one of several possible height adjustments above said means providing for the support of a person, said latching means having one latching part fixed to said lower end of the balancing and control member for rotation therewith and a second latching part fixed to said means providing for the support of a person; resilient means for normally keeping said parts in interlatched relationship; means operable by the person supported by said means providing for the support of a person for unlatching said parts against the urge of said resilient means; and means for attaching a towline to said device.

2. A device according to claim 1, wherein the one part of the latching means is provided with a series of latching elements at least partially concentric with the axis of rotation of the balancing and steering control member, and the second latching part is arranged to latch with a selected one of said latching elements.

3. A device according to claim 2, wherein the one part of the latching means is a drum having a series of recesses arranged about its circumference; and wherein the second latching part is a pin adapted for latching entry into a selected one of said recesses.

4. A device according to claim 3, wherein the drum is at least in part a cog wheel; wherein the pin is a detent dog fixedly mounted on a shaft which is rotatably secured to the means providing for the support of a person; and wherein the means for normally keeping the latching parts in interlatched relationship are springs at opposite ends of said shaft.

5. A device according to claim 4, wherein the means for unlatching the latching parts comprises a foot pedal affixed to the shaft so as to withdraw the dog from the drum part of the latching arrangement when pressed, said foot pedal being positioned adjacent said drum and spaced upwardly from the means providing for the support of a person.

6. A device according to claim 3, wherein the resilient means for normally keeping the parts in interlatched relationship normally biases the pin toward the drum; and wherein the means for unlatching the latching parts comprises a lever pivoted adjacent to the said other end of the balancing and steering control member, and a flexible line operably connecting said lever with said pin.

7. A device according to claim 6, wherein the lever is associated with handle means affixed to the said other end of the balancing and steering control member.

8. A device according to claim 1, wherein the balancing and steering control member comprises telescoped upper and lower longitudinal sections, the upper section being extendible and retractable relative to the lower section for lengthening and shortening, respectively, said control member; a latching arrangement for securing said upper section in a selected one of several possible positions relative to said lower section; and means adjacent to the said other end of the balancing and steering control member for operation by the user of the device of said latching arrangement for securing the upper section.

9. A device according to claim 8, wherein the latching arrangement for securing the upper section of the balancing and steering control member comprises longitudinal series of latch-pin-receiving recesses in and extending transversely of opposite longitudinal walls of the elongate balancing and steering control member; spring-biased, oppositely disposed, latch pins normally urged through corresponding opposite walls of said control member toward said series of recesses for entering selected sets of opposed recesses; and means operable by the user of the device for overcoming the biasing of said pin means and positioning said pin means in selected sets of opposed recesses.

10. A device according to claim 8, wherein a handle bar having a pair of handle members is attached to the said other end of said control member; wherein there is a lever associated with one of said handle members and connected with said one latching part of the said latching means that holds said other end of the balancing and control member in a selected one of several possible height adjustments for enabling the user of the device to operate said one latching part; and wherein the operating means adjacent the said other end of the control member is a lever associated with the other of said handle members and connected with the said latching arrangement for securing the upper section of the control member to the lower section thereof in selected positions of length adjustment.

11. A device according to claim 1, wherein the board means comprises a user support board member to which the balancing and steering control means is secured.

12. A device according to claim 1, wherein the means for providing a means providing for the support of a person comprises an adapter secured to the said one end of the balancing and steering control means for receiving and being fastened to a user support board member.

13. A device according to claim 12, wherein the adapter is in the form of a housing for fitting over and enclosing the forward end of the user support board member.

14. A device according to claim 12, wherein the adapter is in the form of a hood for fitting over the forward end of the user support board member.

15. A water recreational device, comprising means providing for the support of a person while being towed over the surface of a body of water; an elongate balancing and steering control member having one end rotatably secured to said means and the other end free for gripping by the person using the device and for raising or lowering said balancing and steering control member relative to said means about the axis of rotation of the securement of said balancing and control member to said means; latching means interposed between said balancing and control member and said means providing for the support of a person for securely holding said other end of said balancing and control member at a selected height above said means providing for the support of a person, said balancing and steering control member comprising telescoped upper and lower longitudinal sections, the upper section being extendible and retractable relative to the lower section for lengthening and shortening, respectively, said control member; a latching arrangement for securing said upper section in a selected one of several possible positions relative to said lower section; means adjacent to the said other end of the balancing and steering control member for operation of said latching arrangement by the user of the device, said latching arrangement comprising longitudinal series of latch-pin-receiving recesses in and extending transversely of opposite longitudinal walls, respectively, of said lower section of the elongate balancing and steering control member; spring-biased, oppositely disposed, latch pin means mounted in said upper section of said control member and normally urged through corresponding opposite walls thereof toward said series of recesses for entering selected sets of opposed recesses; means operable by the user of the device for overcoming the biasing of said pin means so that said pin means can be positioned in a selected different set of opposed recesses, said means operable by the user for overcoming bias of said pin means comprising a pair of cam plates operable on said pin means to extend or retract them; spring means arranged to bias said cam plates and thereby said pin means; a flexible line connected to said cam plates for enabling the user of the device to simultaneously retract said cam plates and thereby said pin means; and means for attaching a towline to said device.

16. A device according to claim 15, wherein the means operable by the user for overcoming the bias of the pins includes a lever pivoted adjacent to the other end of the balancing and steering control member, said flexible line being operably connected to said lever.

17. A device according to claim 16, wherein the lever is associated with handle means affixed to the said other end of the elongate balancing and steering control member.

18. A device according to claim 15, wherein the cam plates are provided with slots, respectively; and wherein the latch pins are provided with camming projections, respectively, which extend into respective ones of said slots of said cam plates.

19. A device according to claim 15, wherein said means providing for the support of a person comprises a user support board member to which the balancing and steering control means is secured.

20. A device according to claim 15, wherein said means providing for the support of a person comprises an adapter secured to the said one end of the balancing and steering control means for receiving and being fastened to a user support board member.

21. A device according to claim 19, wherein the adapter is in the form of a housing for fitting over and enclosing the forward end of the user support board member.

22. A device according to claim 20, wherein the adapter is in the form of a hood for fitting over the forward end of the user support board member.

23. A water recreational device, comprising means providing for the support of a person while being towed over the surface of a body of water; an elongate balancing and steering control member having a lower end rotatably secured to said means and an upper end carrying a handle for gripping by the person using the device and for pivotally raising or lowering said balancing and steering control member relative to said means about the axis of rotation of the securement of said lower end of the balancing and steering control member to said means; latching means interposed between said lower end of the balancing and steering control member and said means providing for the support of a person and adjacent to and in operative association with said axis of rotation for normally securely holding said upper end of said balancing and steering control member at a selected one of several possible height adjustments above said means providing for the support of a person, said latching means having one latching part fixed to said lower end of the balancing and steering control member for rotation therewith and a second latching part fixed to said means providing for the support of a person, said means providing for the support of a person comprising an adapter shaped to fit over and about the forward end of a user support board member, said adapter being secured to the said lower end of the balancing and steering control member and constructed for receiving and being fastened to the forward end of a user support board member; and means for attaching a towline to said device.

24. A device according to claim 23, wherein the adapter is in the form of a housing for fitting over and enclosing the forward end of the user support board member.

25. A device according to claim 23, wherein the adapter is in the form of a hood for fitting over the forward end of the user support board member.

* * * * *